United States Patent
Agnew

[11] Patent Number: 5,967,623
[45] Date of Patent: Oct. 19, 1999

[54] PRE-LOADED ELASTOMERIC ACCUMULATOR FOR HYDRAULIC SYSTEM

[75] Inventor: David L. Agnew, Clarkson, Mich.

[73] Assignee: ITT Manufacturing Enterprises, Inc., Wilmington, Del.

[21] Appl. No.: 08/876,002

[22] Filed: Jun. 13, 1997

[51] Int. Cl.$^6$ ............................. F16L 55/00; B60T 17/00
[52] U.S. Cl. ...................... 303/87; 138/26; 303/DIG. 11
[58] Field of Search ...................... 303/87, 115.1–115.5, 303/113.1, 119.1, 10, DIG. 11; 417/540; 60/413, 416; 192/109 F; 138/26, 27, 28, 29, 30, 31, 41, DIG. 5; 188/314, 315; 267/64.11, 140.2; 220/720–723; 181/209, 207, 233, 272

[56] References Cited

U.S. PATENT DOCUMENTS

| | | |
|---|---|---|
| 3,757,825 | 9/1973 | Givens et al. . |
| 4,413,652 | 11/1983 | Allewitz ................................. 138/31 |
| 4,432,254 | 2/1984 | Schultz . |
| 4,453,782 | 6/1984 | Arikawa et al. . |
| 4,532,856 | 8/1985 | Taylor . |
| 4,571,009 | 2/1986 | Jones . |
| 4,651,781 | 3/1987 | Kandelman ........................... 138/30 |
| 4,732,176 | 3/1988 | Sugimura .............................. 138/30 |
| 4,823,844 | 4/1989 | Bartholmew .......................... 138/30 |
| 4,828,335 | 5/1989 | Fuller et al. . |
| 5,066,075 | 11/1991 | Kaneda et al. . |
| 5,096,400 | 3/1992 | Budecker et al. . |
| 5,143,428 | 9/1992 | Toda et al. . |
| 5,195,619 | 3/1993 | Dourson et al. ..................... 188/314 |
| 5,209,553 | 5/1993 | Burgdorf et al. .................... 303/87 |
| 5,209,554 | 5/1993 | Beilfuss et al. . |
| 5,232,273 | 8/1993 | Eckstein et al. . |

(List continued on next page.)

FOREIGN PATENT DOCUMENTS

| | | |
|---|---|---|
| 0491159A1 | 11/1991 | European Pat. Off. . |
| 1373140 | 12/1964 | France . |
| 1963709 | 7/1971 | Germany . |
| 4029846 | 4/1991 | Germany . |
| 4002635 | 8/1991 | Germany . |
| 4128386 | 3/1993 | Germany . |
| 1106759 | 4/1989 | Japan . |
| 539022 | 2/1993 | Japan ....................................... 303/87 |

OTHER PUBLICATIONS

Fluid Technology–Accumulators, pp. 360 and 361, pre Dec. 7, 1993.
Fluid Power Control, Staff of Dynamic Analysis and Control Laboratory of the Massachusetts Institute of Technology, pp. 576, 577, 580 and 581.
Fluid Power Design Handbook, Frank Yeaple–Design News Magazie, pp. 191, 193 and 204.
Performance Plastics Products Inc., Specifications,.
Wayne Wire Cloth Catalog, various pages,.
Controlled Porosity P/M Components, SSI–Sintered Specialties.

*Primary Examiner*—Douglas C. Butler
*Attorney, Agent, or Firm*—Rader, Fishman & Grauer PLLC

[57] ABSTRACT

A hydraulic control unit for a hydraulic vehicle control system, such as anti-lock brakes, includes a hydraulic accumulator including a housing that defines a cavity and a passageway that extends from the cavity and that is adapted for inner-connection with a host hydraulic circuit, preferably adjacent the high pressure outlet of the host system hydraulic pump. A closure member cooperates with the housing to substantially seal the cavity. A pre-loaded elastomeric member is disposed within the cavity and is compressible with increasing hydraulic fluid pressure to attenuate short duration pressure pulses therein. The elastomeric member is preferably enclosed within a rigid relatively porous member that, in combination with the elastomeric member, substantially fills the entire volume of the cavity and permits pressurized fluid to act on substantially the entire outer surface of the elastomeric member to minimize internal friction and hysterisis losses and provides the structure, along with the closure member, to pre-load the elastomeric member.

11 Claims, 6 Drawing Sheets

U.S. PATENT DOCUMENTS

| | | |
|---|---|---|
| 5,244,262 | 9/1993 | Kehl et al. . |
| 5,271,667 | 12/1993 | Takata et al. . |
| 5,410,945 | 5/1995 | Schops et al. ............................. 303/87 |
| 5,425,573 | 6/1995 | Mirlucca .................................. 303/87 |
| 5,468,056 | 11/1995 | Kim ......................................... 303/87 |
| 5,540,486 | 7/1996 | Linkner . |
| 5,618,629 | 4/1997 | Takamatsu et al. ...................... 138/30 |
| 5,655,569 | 8/1997 | Tackett ..................................... 138/30 |
| 5,664,848 | 7/1997 | Muraski ................................... 303/87 |
| 5,682,923 | 11/1997 | Goloff et al. ............................. 303/87 |
| 5,709,248 | 1/1998 | Goloff ...................................... 138/26 |

PRE-LOADED ELASTOMERIC ACCUMULATOR FOR HYDRAULIC SYSTEM

INTRODUCTION

The present invention relates to hydraulic accumulators which are employed to attenuate high pressure fluctuations in hydraulic fluid systems and, more particularly, the application of such attenuators in motor vehicle anti-lock brake systems.

BACKGROUND OF THE INVENTION

Accumulators are traditionally used in hydraulic circuits to provide or absorb momentary flow of hydraulic fluid, to attenuate pressure fluctuations in the hydraulic circuit and minimize the resulting degrading of host system components. The extra capacity provided by an accumulator also enables the overall system to be designed with smaller pumps without loss of performance. An accumulator serves to provide an extra volume of hydraulic fluid at a specific point in the circuit which has been maintained at system pressure, most typically by the force of a compressed gas. In that form, the accumulator serves as an auxillary power source, pulsation damper, fluid dispenser (discharging a known volume), suction stabilizer, leakage make-up source, or thermo expansion volume compensator.

Most accumulators pressurize the hydraulic fluid therein by the use of compressed gas separated from hydraulic fluid by a permeation resistant resilient bladder. Springs and weighted structures have also been employed to pressurize fluid within an accumulator.

Fluid-filled accumulators have been employed in vehicular braking systems due largely to their relatively simple and compact structure. They can be particularly advantageously applied in anti-lock brake systems (ABS) when located near the outlet of an associated hydraulic pump which is used to generate supplemental brake fluid pressure required to actuate the brakes at the wheel cylinders through an ABS hydraulic control unit independently of the brake pedal being actuated by the operator. The accumulator assists in significantly reducing the amplitude of the brake fluid high energy pressure pulses at the outlet of the pump, thereby helping to eliminate or substantially reduce the mechanical noise hydraulically generated in the braking system and traveling through the master cylinder or its connection to the vehicle into the passenger compartment.

A conventional accumulator, as assembled, in effect has no moving parts. It basically comprises a closed chamber filled with brake fluid having an inlet from the high pressure output side of the pump and an outlet through an orifice of substantially reduced diameter. Because of the restriction of flow through the orifice, the pressure fluctuations are attenuated as a result of the compressibility of the brake fluid itself, i.e. absorbing the high energy fluid pulses and slowly releasing it through the orifice.

A conventional accumulator used for this purpose typically has significant axial length as it is required to (i.) facilitate several O-ring seals confirming the brake fluid to the accumulator and assuring its prescribed flow through the accumulator, and (ii.) assure the isolation of the incoming fluid to the accumulator reservoir and through the outlet orifice, thereby avoiding any short circuiting of the function of the accumulator. This conventional design also requires a bleed port and fitting for allowing a means of eliminating entrapped air from the brake fluid line. It also requires a compression spring for maintaining the attenuator cylinder firmly against a retaining clip, holding the cylinder in fixed position relative to the hydraulic control unit.

The use of solid elastomeric members in accumulators has been proposed to absorb shock in high pressure hydraulic systems. For example, U.S. Pat. No. 5,540,486 to Linkner, describes a hydraulic control unit for a vehicle anti-lock brake system including an attenuator made-up of a compresssibly deformable solid core member disposed within a sealed chamber. The attenuator's deformable member is configured to substantially fill a chamber but to provide a clearance relationship between the deformable member and the chamber walls to thereby expose most sides of the deformable member to brake fluid pressure.

Although apparently overcoming some of the aforementioned shortcomings of conventional accumulator structures, the accumulator described in the '486 patent has certain limitations. Specifically, by spacing the deformable member from the walls of the cavity, under pressure, the deformable member will contort in an unpredictable manner fictionally engaging and moving locally with respect to adjacent cavity surfaces, leading to unequal distribution of pressure on a deformable member which causes hysteresis due to mechanical friction between the member and the cavity walls. Furthermore, although the abstract of the '486 patent states that all sides of the deformable member are exposed to brake fluid pressure, that simply is not the case. This attenuator has, in fact, many of the same infirmities as earlier solid elastomeric accumulators inasmuch as a substantial part of the elastomeric member (that which is abutting head member 44) remains in intimate contact with the cavity wall, thereby creating pressure asymmetries imposed by the hydraulic fluid on the deformable member.

BRIEF DESCRIPTION OF THE INVENTION

Accordingly, it is an object of the present invention to provide a hydraulic accumulator which has a compact and extremely robust design, no moving parts, is simple to assemble and overcomes the shortcomings of the prior art described hereinabove.

The inventive hydraulic accumulator includes a housing which defines a cavity and a passageway that extends from the cavity which is adapted for interconnection with a hydraulic circuit such as a vehicle anti-lock brake system. A closure member cooperates with the housing to substantially seal the cavity. A pre-loaded elastomeric member is disposed within the cavity and, in application, is further compressible to attenuate hydraulic fluid pressure pulses exceeding a threshold level. This arrangement has the advantage of distinguishing relatively high and low pressure pulses, attenuating high pressure pulses and ignoring low pressure pulses to maximize overall response of the host system.

In the preferred embodiment of the invention, the accumulator also includes a relatively rigid porous member which is disposed within the cavity and co-acts with the elastomeric member to substantially fill the entire volume of the cavity. This arrangement has the advantage of providing support to pre-load the elastomeric member and permitting pressurized fluid to be applied to a substantial portion of the surface area of the elastomeric member while minimizing any hystersis loss as a result from movement of the elastomeric member.

According to another aspect of the invention, the elastomeric member is nestingly exposed entirely within the porous member. This arrangement has the advantage of ensuring the hydraulic fluid pressure is applied equally over the entire surface area of the elastomeric member.

According to another aspect of the invention, the closure member is arranged to effect the pre-loading of the elastomeric member upon positioning in its as-installed position. This arrangement has the advantage of providing simple, accurate and repeatable (unit to unit) pre-loading of the elastomeric member.

According to still another feature of the invention, the elastomeric and porous members define complementary adjoining surfaces. This arrangement has the advantage of ensuring that reaction forces are applied by the pre-loaded elastomeric member symmetrically to the porous member, eliminating any localized stress risers.

These and other features and advantages of this invention will become apparent upon reading the following specification which, along with the drawings, describes and discloses preferred and alternative embodiments of the invention in detail.

DETAILED DESCRIPTION OF THE PREFERRED AND ALTERNATIVE EMBODIMENTS

Figure 1:
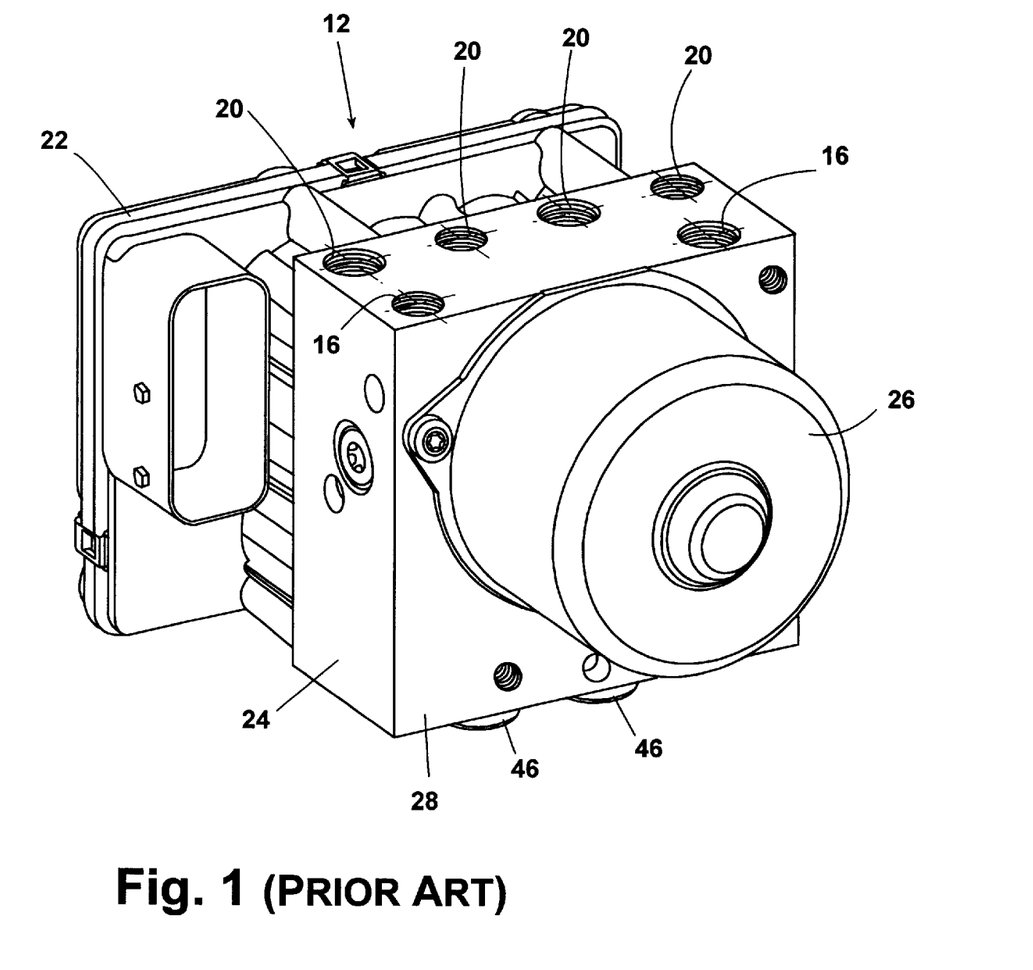
FIG. 1, is a perspective view of an assembled typical vehicle anti-lock system controller.
Figure 2:
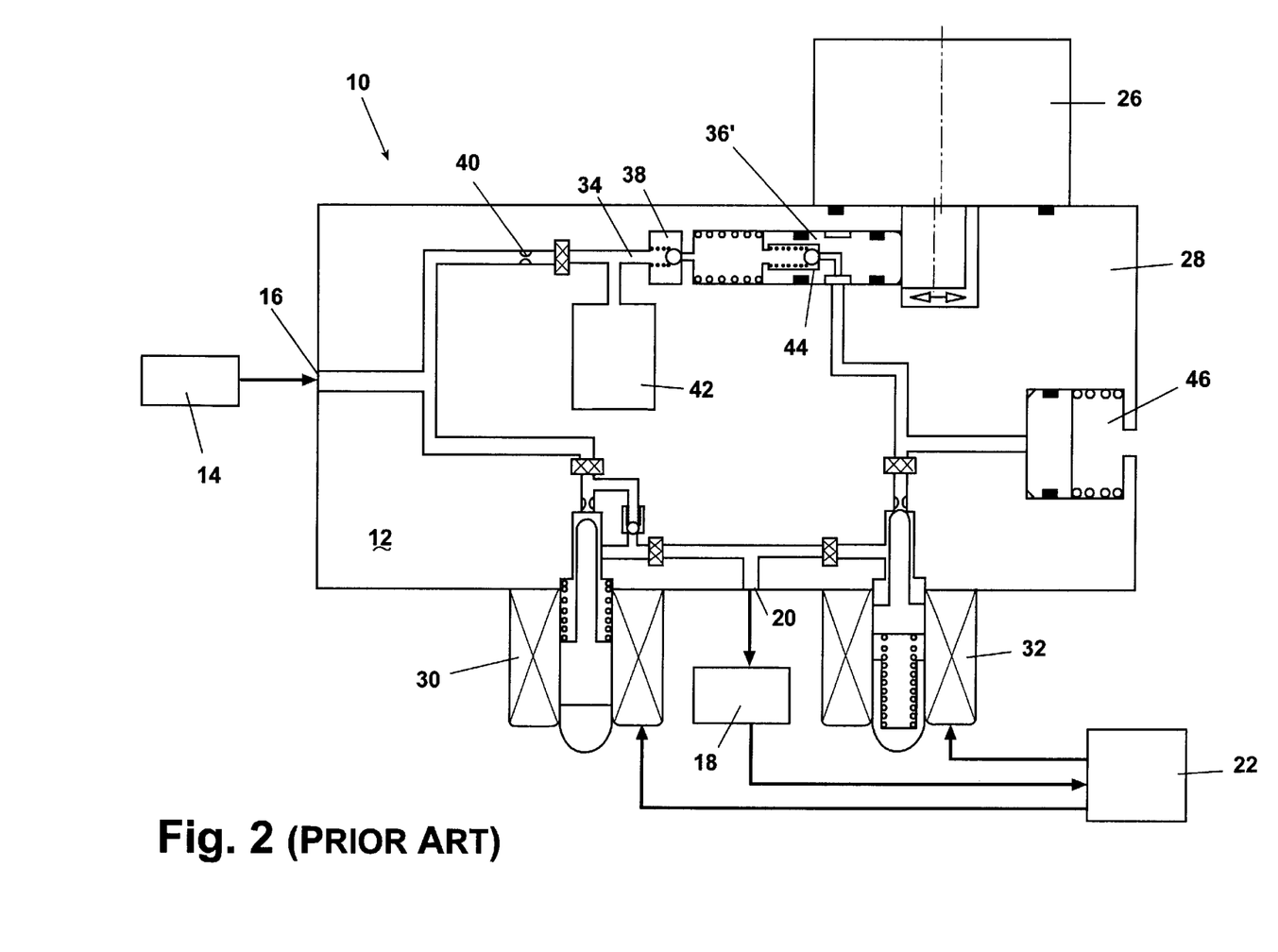
FIG. 2, is a schematic representation of an ABS system employing the controller of FIG. 1.

Referring to FIGS. 1 and 2, a conventional automobile braking system, generally designated 10 includes an anti-lock braking function provided by an anti-lock control module 12. In addition to module 12, system 10 typically comprises a tandem master cylinder 14 fluidly interconnected to module 12 via one or more inlet ports 16 and wheel calipers 18 fluidly interconnected with module 12 via a plurality of outlet ports 20.

The system 10 is illustrated schematically in FIG. 2 to show basic operation of a host hydraulic system. For the sake of simplicity, only single lines interconnecting tandem master cylinder 14 and wheel calipers 18 to module 12 are illustrated, it being understood that systems in use in the industry today employ dual redundant feeds from tandem master cylinder 14 and separate output feeds to each wheel caliper 18.

Module 12 is made up of an electronic control unit 22, a hydraulic control unit 24 and a pump motor 26. The bulk of hydraulic control unit 24 is integrated within a manifold housing 28 which defines the fluid passageways and houses the various components making up module 12.

Electronic control unit 22 is operative to receive inputs from wheel speed sensors (not shown) associated with each wheel caliper 18 and provide outputs controlling a number of normally open and normally closed valves 30 and 32, respectively, to control the ABS circuit. Inlet port 16 communicates with the normally open valve 30 as well as the high pressure outlet 34 of a reciprocating piston pump 36 driven by motor 26 through an intermediate check valve 38 series connected with an orifice 40. A high pressure accumulator 42 is in-circuit with the point of common connection between orifice 40 and check valve 38. Normally closed valve 32 communicates in parallel with the section side or input of pump 36 through an inlet check valve 44 and a low pressure accumulator 46. Note that low pressure accumulator 46 is illustrated in a more conventional spring pre-loaded piston configuration which is illustrated in detail in FIG. 7a. The remaining ports of valves 30 and 32 are commonly connected to outlet port 20.

Figure 3:
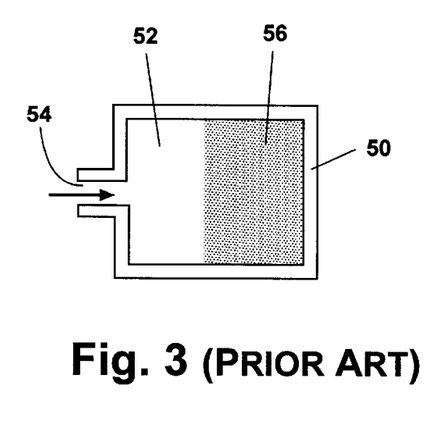
FIGS. 3, 4, 5 and 6, are schematic representations of various designs of hydraulic accumulators.
Figure 4:
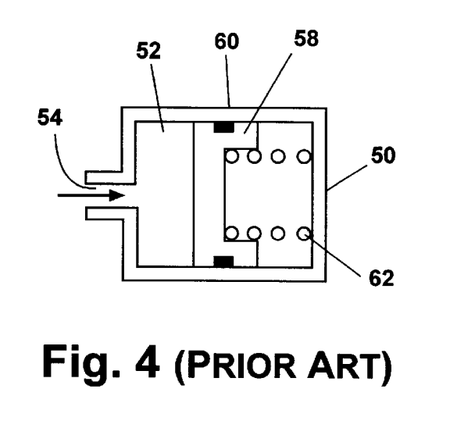
Figure 5:
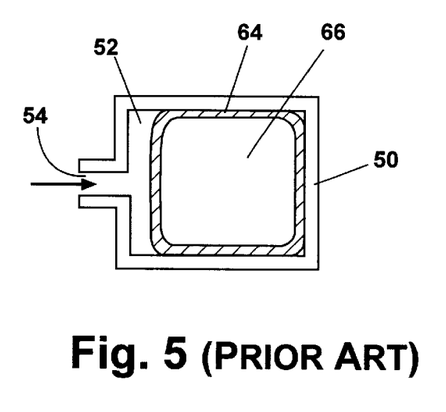
Figure 6:
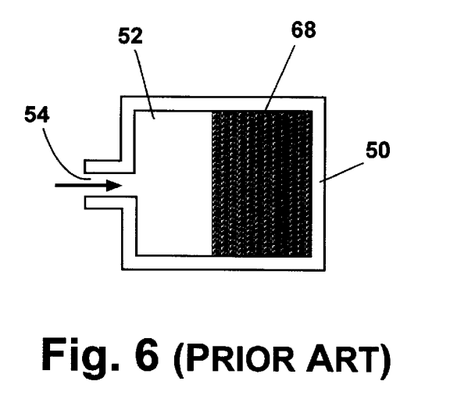

Referring to FIGS. 3–6, four conventional accumulator structures are illustrated. In each alternative embodiment, a substantially closed housing 50 defines an interior cavity 52 which communicates with its respective host hydraulic system through a passageway 54. In FIG. 3, a portion of the cavity 52 is occupied by a resilient closed cell sponge which compresses as a function of the pressure of the hydraulic fluid within the remainder of cavity 52. FIG. 4 illustrates a piston 58 slidably disposed within cavity 52 and sealed with respect thereto by an O-ring or other suitable sealing means 60 and which is biased leftwardly by a compression spring 62. Pressurized fluid within cavity 52 acts upon the leftward facing surface of piston 58 against the biasing effect of spring 62. FIG. 5 has a resilient heavy walled rubber bag 64 disposed therein which is pre-charged with a pressurized gas 66 which compresses, thus allowing bag 64 to expand or collapse as function of pressurized fluid in cavity 52. Lastly, FIG. 6 defines a solid elastomeric member 68 disposed within cavity 52 which compresses as a function of the pressure of hydraulic fluid within cavity 52.

Figure 7A:
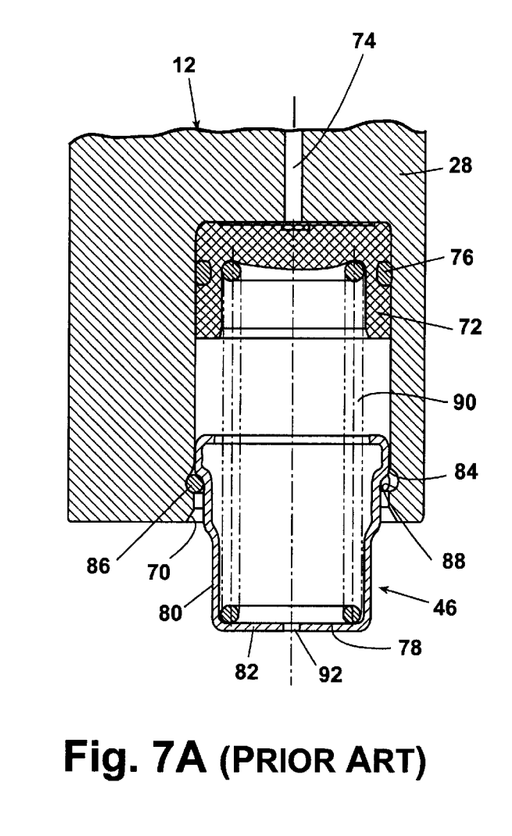
FIG. 7a, is a cross-sectional view of a typical low pressure pre-loaded spring/piston type accumulator employed in anti-lock brake systems.

Referring to FIG. 7a, the structural details of low pressure accumulator 46 are illustrated. A blind bore 70 formed in manifold housing 28 is closed with the exception of a passageway 74 communicating with the rest of the hydraulic circuit. A piston 72 is disposed in the blind end of bore 70 which is slidingly sealed therewith by an O-ring 76. The open end of bore 70 is closed by a stamped cap or closure member 78 which is generally cup-shaped having a cylindrical side wall portion 80 and an end wall portion 82. Side wall portion 80 has a radial step 84 formed therein which abuts a snap ring 86 disposed within a radially opening annular groove 88 formed in bore 70 proximate the opening thereof. Snap ring 86 limits the downward (as viewed in FIG. 7) displacement of closure member 78. A spring 90 compressively simultaneously urges piston 72 upwardly and closure member 78 downwardly from their illustrated end of travel positions. As in the case of the accumulator illustrated schematically in FIG. 4, the accumulator illustrated in FIG. 7 operates whereby pressurized fluid enters the portion of bore 70 above piston 78 via passageway 74 to offset the biasing affect of spring 90. The spring pre-load is set by design to establish a preset pressure at which the piston 72 begins to move. A passageway 92 allows open communication of the volume between the piston 72 and closure member 78 and the atmosphere.

Figure 7B:
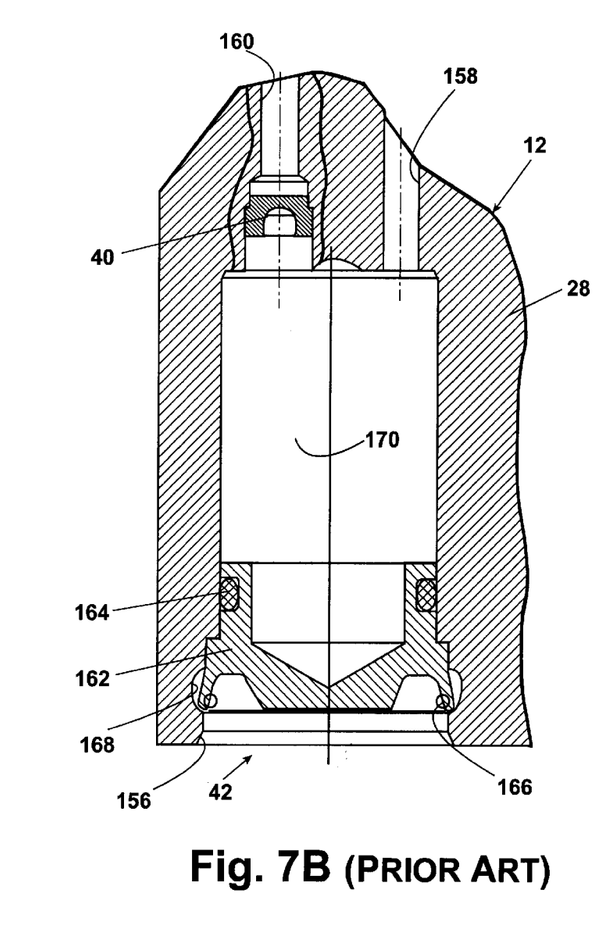
FIG. 7b, is a cross-sectional view of a typical high pressure fluid-filled accumulator employed in anti-lock brake systems.

Referring to FIG. 7b, the structural details of high pressure accumulator 42 are illustrated. A blind bore 156 formed in manifold housing 28 is closed with the exception of an inlet passageway 158 and an outlet passageway 160 communicating with the rest of the hydraulic circuit. Orifice 40, in this particular embodiment, is disposed in outlet passage 160 for packaging convenience. The open end of bore 156 is closed by a closure member or plug 162 which is sealed therewith by an O-ring 164. A skirt 166 integrally formed as part of plug 162 is spun into a radially inwardly opening annular groove 168 to permanently retain plug in its illustrated position. Plug 162 and manifold housing 28 co-act to define a closed cavity 170 which, in application, will be entirely filled with hydraulic fluid.

Figures 8A, 8B:
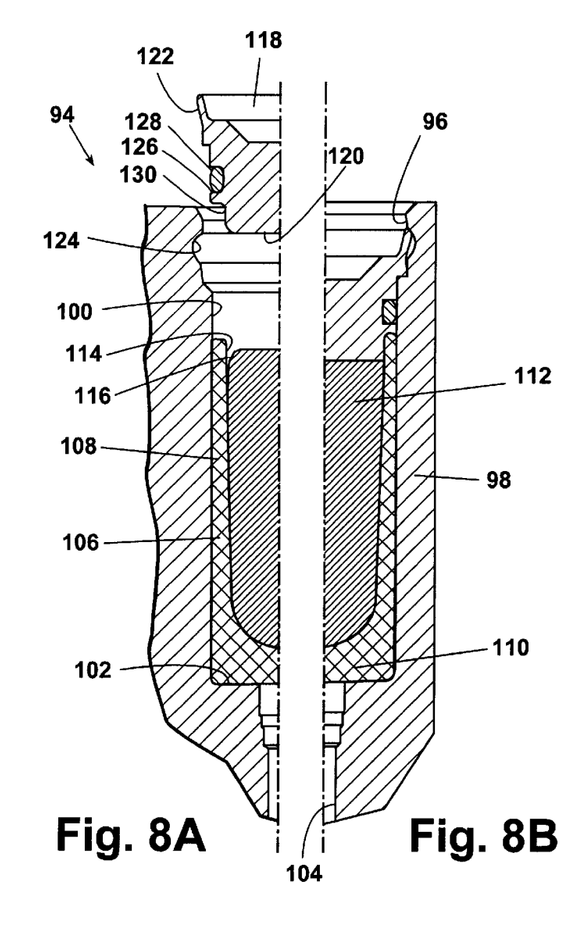
FIG. 8a, is a half centerline view in cross-section of a preferred embodiment of a hydraulic accumulator of the present invention prior to installation of the closure member.
FIG. 8b, is the complementary half centerline view in cross-section of the embodiment of FIG. 8a with the closure member installed.

Referring to FIGS. 8a and 8b, a preferred inventive hydraulic accumulator 94 is illustrated. For purposes of understanding operation of accumulator 94 with its host hydraulic system, accumulator 94 can be substituted for accumulator 42 illustrated schematically in FIG. 2.

A blind bore 96 is formed within a manifold housing 98 defining a cylindrical side wall 100 and an end wall 102. In application, a passageway 104 provides fluid communication between bore 96 and high pressure pump outlet 34. A cup shaped rigid porous member 106 is nestingly slip fit within bore 96 having a generally cylindrical wall 108 and end portion 110. Member 106 is preferably formed of suitable material such as open celled molded thermoplastic pre-molded in the indicated configuration, pressed wire mesh, sintered powered metal or other suitable material having the requisite structural integrity and porosity characteristics for the intended application.

A pre-molded elastomeric member 112 is nestingly slip fit within porous member 106. The inner surfaces of porous member 106 and the outer surfaces of elastomeric member 112, 114 and 116, respectively, are complementarily shaped to provide for assembly and pre-loading. Elastomeric member 112 is preferably formed of EPDM (ethylene propylene), although other materials such as rubber, polymers and the like could be suitable.

A closure member or plug 118 cooperates with housing 98 to close bore 96. FIG. 8a illustrates the accumulator 94 prior to installation of plug 118 and FIG. 8b illustrates the plug 118 in the installed position. In FIG. 8a, elastomeric member 112 is illustrated in its relaxed condition. As plug 118 is installed, its leading (lower most as viewed in FIGS. 8a and 8b) surface 120 abuts the upper most surface 121 of elastomeric member 112 and presses it downwardly. Plug 118 has an outwardly directed skirt 122 which is spun radially outwardly into an annular groove 124 formed in blind bore 96 adjacent the opening thereof to permanently affix plug 118 and its illustrated (in FIG. 8b) position.

An outwardly opening circumferential groove 126 is formed in plug 118 containing an O-ring 128 to ensure a complete seal between plug 118 and housing 98. The leading end 120 of plug 118 has a contoured surface 130.

As shown in FIG. 8b, after assembly, plug 118, elastomeric member 112 and porous member 106 nestingly co-act to fully occupy the cavity 132 defined by bore 96. Closure plug 118 acts to compress the material of elastomeric member 112, effectively pre-loading it in a permanent compressive state. The porosity of member 106 is such that hydraulic fluid entering cavity 132 via passageway 104 freely flows therethrough, saturating porous member 106 and encircling elastomeric member 112. Thus, as applied fluid pressure increases at outlet 34 (FIG. 2), that elevated pressure will be applied uniformly to the entire outer surface of elastomeric member 112 without causing hysteresis or mechanical friction. Due to the equal distribution of pressure, the change of volume of elastomeric member 112 with increased hydraulic pressure will cause a shrinking affect, with no relative motion between the surfaces of the elastomer and the enclosure, and therefore, no mechanical friction.

Figure 10:
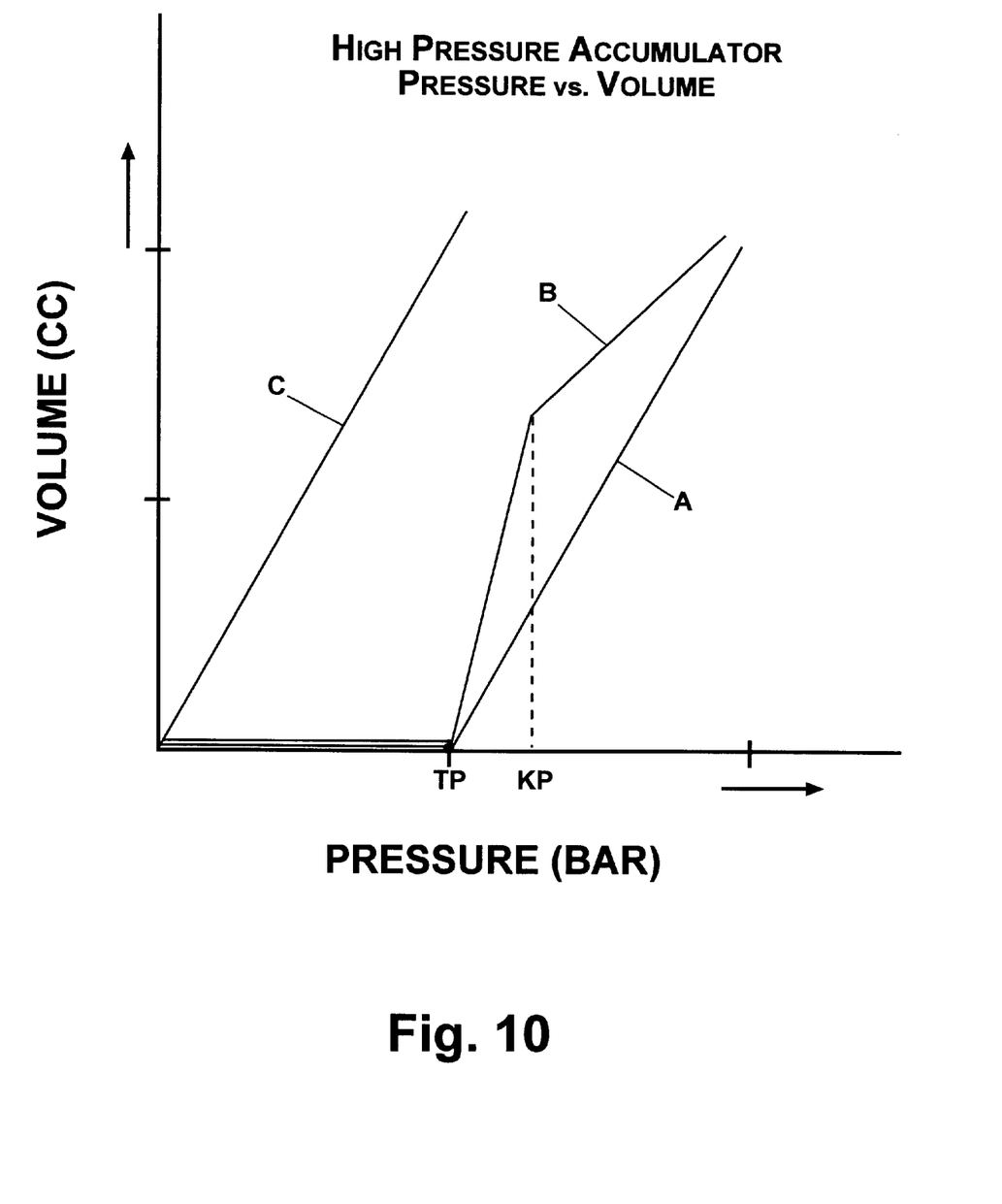
FIG. 10, is a graphical representation of the volume vs. pressure performance characteristic of preferred and alternative embodiments of the present invention as well as a typical prior art high pressure accumulator.

In application, the resulting volume pressure characteristic of accumulator 94 will be as illustrated in Graph A of FIG. 10 wherein due to the pre-loading of the elastomeric member 112, the volume of hydraulic fluid within accumulator 94 will remain constant at a relatively low level until a certain predetermined threshold pressure (TP) is reached and thereafter will increase linearly with further increasing pressure as a function of the bulk modulus of the elastomeric material. The threshold level is established by the initial volume strain when the accumulator is assembled. Conversely, as viewed in Graph C of FIG. 10, an accumulator without pre-loading will draw fluid from the host hydraulic system continuously with increasing pressure thereby permitting fluid volume loss at low pressure operating modes. For example, the vehicle driver's sensory or tactile feedback when applying the brake will affect the establishment of the TP pressure if the damping chamber volume fluid consumption is substantial. Without a pre-loaded accumulator, the driver will sense the loss of fluid, even during modest braking efforts. However, with the pre-loaded elastomeric member in the accumulator, the driver's braking effort will be at or approaching high performance levels before the loss of fluid is apparent to the driver that is deemed to be an exceptable condition.

It is contemplated that the elastomeric member 112 can be made from a large number of materials which are suitably resistant to interaction with brake fluid components and additives as well as any break down products thereof. The suitable material also exhibits prolonged resilience and sealability over the useful life of the device of the present invention at routine service temperatures between about −40° C. and about 120° C.

The material of construction is preferably a resilient flexible polymeric material. The term resilient flexible polymeric material as used herein is taken to encompass plastics, resins and polymers. It is to be understood that polymers are more specifically defined as unadulterated long chainlike molecules, while the use of additives in the polymer usually is indicated by the use of the term "plastic" or "resin". As used herein the term "flexible polymeric material" is taken to encompass both types of materials.

The material of choice can be either thermosetting or thermoplastic crystalline amorphous or a mixture thereof. And can include composited materials for reinforcement provided sufficient functional flexibility is maintained. Also included are suitable thermoplastic elastomers as well as natural and synthetic thermosetting materials.

Examples of suitable crystalline or semicrystaline thermoplastics include, but are not limited to acetates, polyesters, polyamides, polyethylene, and polypropylene. Examples of suitable amorphous thermoplastics include acrylonitrile butadiene-styrene, acrylics such as polymethilmethacrylate, and polystyrene. Examples of suitable thermosetting materials include materials generally referred to as "thermoset elastomers" including but not limited to natural rubber, polyprene, styrene butadiene, polybutadiene neoprene, nitrite, thermosetting polyurethane, butyl rubber, silicone rubber and mixtures thereof.

Figures 9A, 9B:
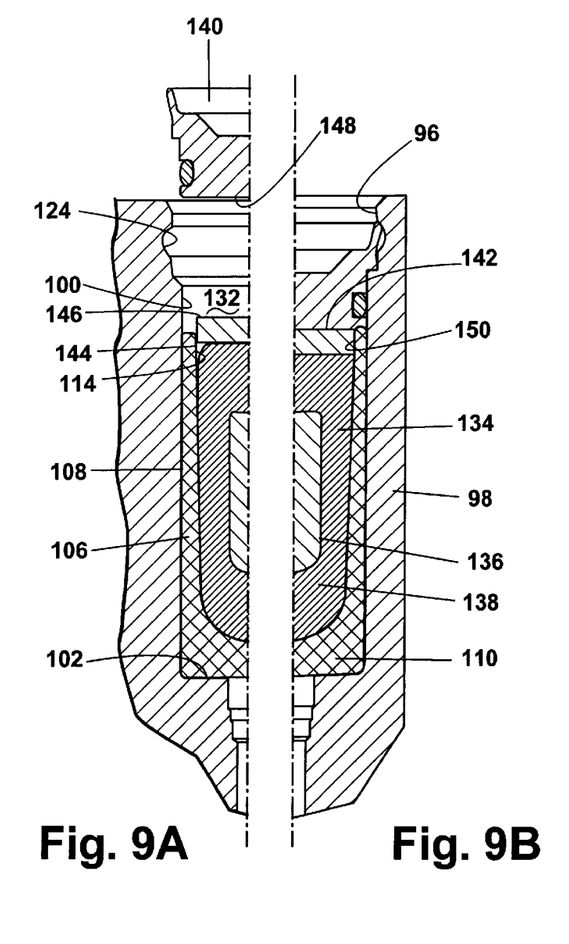
FIG. 9a, is a half centerline cross-section view of an alternative embodiment of the invention prior to installation of the closure member.
FIG. 9b, is a complementary half centerline view in cross-section of the embodiment of FIG. 9a with the closure member installed.

Referring to FIGS. 9a and 9b, an alternative embodiment of the invention is illustrated. Except as is noted in the following, the construction and characteristics of the alternative embodiment in FIGS. 9a and 9b are as described with respect to FIGS. 8a and 8b. An elastomeric member 134 is disposed within porous member 106 and is constructed of a composite outer layer of EPDM or other suitable material and an inner layer of a differing material having a different characteristic bulk modulus. Outer layer 136 and inner layer 138 collectively are formed and operate as described with respect to the accumulator of FIGS. 8a and 8b with the exception that for pressure increases above the knee point (KP), there will be a change in slope or distinct kink in the volume-pressure characteristic as illustrated in trace B in FIG. 10. The relative slopes of the components of trace B as well as the relative location of KP can be established by the selection of suitable materials for the inner and outer layers 136 and 138.

In FIGS. 9a and 9b, prior to insertion of closure member or plug 140, a generally disk shaped second porous member 142 is placed on the uppermost surface of elastomeric member 134. After assembly, the lowermost surface 148 of plug 140 is in abutting relationship with the uppermost surface of second porous member 142 and the lowermost surface 144 of the second porous member 142 is in abutting relationship with the uppermost surface of the elastomeric member 134. As assembled, elastomeric member 134 is pre-loaded as described with respect to member 112 of FIGS. 8a and 8b.

The radially outwardly directed circumferential surface 150 of the second porous member 142 will, after assembly, conform with the radially inwardly directed axially uppermost surface of porous member 106 as best viewed in FIG. 9b. Thus, porous members 106 and 142 will co-act to ensure that hydraulic fluid circulates fully around elastomeric member 138.

It is to be understood that the invention has been described with reference to specific embodiments and variations to provide the features and advantages previously described and that the embodiments are susceptible of modification as will be apparent to those skilled in the art. For example, a composite of more than two materials to make up the elastomeric member can be employed to provide a tailored pressure-volume response characteristic. Accordingly, the foregoing is not to be construed in a limiting sense.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed:

1. A hydraulic accumulator comprising:
   a housing defining a cavity and a passageway extending therefrom adapted for interconnection with a hydraulic circuit;
   a closure member cooperating with said housing to substantially close said cavity;
   pre-loaded elastomeric member disposed within said cavity that is compressible to attenuate hydraulic fluid pressure pulses; and
   a relatively rigid porous member disposed within said cavity and co-acting with said elastomeric member to substantially fill the entire volume defined by said cavity, wherein said elastomeric member is nestingly disposed within said porous member.

2. The hydraulic accumulator of claim 1, wherein said porous member is formed of open celled molded thermoplastic.

3. The hydraulic accumulator of claim 1, wherein said porous member is formed of wire mesh.

4. The hydraulic accumulator of claim 1, wherein said porous member is formed of sintered powdered metal.

5. The hydraulic accumulator of claim 1, wherein said elastomeric member is formed of natural rubber.

6. The hydraulic accumulator of claim 1, wherein said closure member includes seal means effecting a fluid tight interface with said housing.

7. The hydraulic accumulator of claim 1, wherein said closure member is operative to effect pre-loading of said elastomeric member.

8. The hydraulic accumulator of claim 1, wherein said elastomeric member is constructed of a plurality of members having differing bulk modulus.

9. The hydraulic accumulator of claim 1, wherein said elastomeric member is constucted at least in part of EPDM material.

10. A hydraulic accumulator for a vehicle anti-lock brake system comprising:
    a housing defining a blind bore cavity having a side wall and an end wall;
    a fluid passageway extending from one of said walls adapted for interconnection with a hydraulic circuit;
    a relatively rigid porous member nestingly disposed within said cavity and defining a contoured inner surface;
    a substantially solid elastomeric member nestingly disposed with said porous member and cooperating therewith to substantially fill the entire volume defined by said cavity; and
    a closure member cooperating with said housing to substantially close said cavity and compressively pre-load said elastomeric member.

11. A vehicle anti-lock brake control module comprising:
    a hydraulic circuit adapted for fluid interconnection with a master cylinder and with at least one wheel brake;
    pump means operable to pressurize hydraulic fluid within said circuit;
    valve means responsive to parametric inputs to fluidically configure said circuit to effect anti-lock control of a host vehicle; and
    a hydraulic accumulator including,
        a housing defining a blind bore cavity having a side wall and an end wall,
        a fluid passageway extending from one of said walls adapted for interconnection with said hydraulic circuit,
        a relatively rigid porous member nestingly disposed within said cavity and defining a contoured inner surface,
        a substantially solid elastomeric member nestingly disposed with said porous member and cooperating therewith to substantially fill the entire volume defined by said cavity, and
        a closure member cooperating with said housing to substantially close said cavity and compressively pre-load said elastomeric member.

* * * * *

UNITED STATES PATENT AND TRADEMARK OFFICE
CERTIFICATE OF CORRECTION

PATENT NO. : 5,967,623
DATED : 10/19/99
INVENTOR(S) : Agnew, David L.

It is certified that error appears in the above-identified patent and that said Letters Patent is hereby corrected as shown below:

On the cover page, on the "Inventor" line, please change "Clarkson" to --Clarkston--.

In column 8, in claim 9, please change "constucted" to --constructed--.

Signed and Sealed this

Twenty-second Day of May, 2001

Attest:

NICHOLAS P. GODICI

Attesting Officer    Acting Director of the United States Patent and Trademark Office